United States Patent
Graham et al.

(10) Patent No.: US 7,437,688 B2
(45) Date of Patent: Oct. 14, 2008

(54) ELEMENT ROUTING METHOD AND APPARATUS

(75) Inventors: Sammy J. Graham, East Peoria, IL (US); Gerard K. Moehn, Dunlap, IL (US); Hong Chen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 106 days.

(21) Appl. No.: 10/026,737

(22) Filed: Dec. 27, 2001

(65) Prior Publication Data

US 2003/0126576 A1    Jul. 3, 2003

(51) Int. Cl.
*G06F 17/50* (2006.01)
(52) U.S. Cl. .................. 716/1; 716/11; 703/1; 700/107
(58) Field of Classification Search .................. 716/121, 716/12, 13; 700/97, 83; 29/854, 857
See application file for complete search history.

(56) References Cited

U.S. PATENT DOCUMENTS

| | | | | | |
|---|---|---|---|---|---|
| 3,863,319 | A | * | 2/1975 | Pellet | 29/714 |
| 4,638,442 | A | * | 1/1987 | Bryant et al. | 716/14 |
| 4,692,974 | A | * | 9/1987 | Cross | 29/33 M |
| 4,711,025 | A | * | 12/1987 | DeSanto | 29/854 |
| 4,803,778 | A | * | 2/1989 | Cross | 29/857 |
| 4,875,162 | A | * | 10/1989 | Ferriter et al. | 705/29 |
| 5,293,479 | A | * | 3/1994 | Quintero et al. | 715/841 |
| 6,110,213 | A | * | 8/2000 | Vinciarelli et al. | 703/1 |
| 6,230,403 | B1 | * | 5/2001 | Skoolicas et al. | 29/852 |
| 6,272,387 | B1 | * | 8/2001 | Yoon | 700/83 |
| 6,438,435 | B1 | * | 8/2002 | Wada et al. | 700/97 |
| 6,457,165 | B1 | * | 9/2002 | Ishikawa et al. | 716/12 |
| 6,847,853 | B1 | * | 1/2005 | Vinciarelli et al. | 700/97 |
| 7,107,197 | B1 | * | 9/2006 | Shropshire | 703/13 |
| 2003/0050723 | A1 | * | 3/2003 | Ozaki | 700/97 |
| 2003/0079197 | A1 | * | 4/2003 | Pannala et al. | 716/13 |
| 2004/0078767 | A1 | * | 4/2004 | Burks et al. | 716/8 |
| 2005/0080502 | A1 | * | 4/2005 | Chernyak et al. | 700/97 |
| 2005/0183052 | A1 | * | 8/2005 | Ash-Rafzadeh | 716/8 |

* cited by examiner

*Primary Examiner*—Leigh Marie Garbowski
(74) *Attorney, Agent, or Firm*—Finnegan, Henderson, Farabow, Garrett & Dunner

(57) ABSTRACT

A method is provided for designing a system including an element, wherein the element connects a plurality of components. First, a system design including the plurality of components is established. A diagram associated with the system design is generated, the wiring diagram including the element and the plurality of components. Guidelines for designing the structure are established. A routing pattern in the system for the element is then determined automatically based on the diagram and the guidelines.

22 Claims, 2 Drawing Sheets

ELEMENT ROUTING METHOD AND APPARATUS

TECHNICAL FIELD

The present invention relates generally to connecting components and, more particularly, to systems and methods for designing wire or cable harnesses.

BACKGROUND

Wire harnesses are pre-formed groupings of two or more wires routed through a structure or element. Harnesses, or other routing elements, may be used to ensure that electronic components in a machine, such as electronic control modules (ECMs) or sensors, are properly connected. The wires, or connections, used to connect the components may be of different lengths and each wire may have a different starting or ending area within the machine. In addition to the advantage that the harnesses provide for proper connections, the harnesses may also be made remotely and then added to the machine at a later point in production.

Simple harnesses may route the wires through the structure in parallel fashion. More complex harnesses, however, may route the wires in a more efficient manner. For example, harnesses may be designed to minimize the number of wire splices or bundles. Harness designs may need to conform to a certain set of guidelines. For example, in most applications, the size of the completed harness must fit within a certain allotted space. Additionally, there are design guidelines and standards to be followed. There may be machine-dependent standards, for example, relating to the proximity of wires to a heat source or the proximity of wires to an edge of a machine. There may also be component-dependent standards, such as limits on the bend radius associated with each wire or the number of clips. Inefficient harness routing may cause unnecessary lengths of the routing element. Further, incorrect harness routing may cause short and/or long term damage to the routing element.

Currently, much of the harness design process is done by an individual. For example, the individual may develop the harness design manually, either by manually drawing the element or manually entering the design into an electronic wiring package. In either case, the actual substance of the design process, such as the guidelines followed and the efficiencies chosen, is borne by the individual designer. One disadvantage of this process is that there is little uniformity among harnesses developed by different individuals. Further, harness designs may be inefficient. Poor designs may lead to problems with the connecting elements. Additionally, the guidelines for the individual to follow are often not centrally located. Therefore, any applicable guideline may not be followed in every harness design. Furthermore, the process is repetitive and changes in the machine often require the process to be repeated from the beginning. For example, if the shape or footprint of the machine in which the harness will be used is changed, the harness must be entirely redesigned.

The present invention is directed to overcoming one or more of the problems or disadvantages associated with the prior art.

SUMMARY OF THE INVENTION

A method is provided for designing a system including an element, wherein the element connects a plurality of components. First, a system design including the plurality of components is established. A diagram associated with the system design is generated, the wiring diagram including the element and the plurality of components. Guidelines for designing the structure are established. A routing pattern in the system for the element is then determined automatically based on the diagram and the guidelines. Another aspect of the present invention includes providing a computer-readable medium including instructions for performing the above-described method. Yet another aspect of the present invention includes providing a system, including a routing design module configured to perform the above-described method.

Further, a system is provided for designing a system including an element, wherein the element connects a plurality of components. The system includes a processor and a memory. The memory includes a computer-aided design module for establishing a system design and generating a diagram associated with the system design, one or more guidelines for designing the system, and a routing design module for automatically determining routing patterns in the structure for the element based on the diagram and the guidelines.

A method is further provided for routing an element among a plurality of components. The plurality of components to be connected are established. The routing guidelines are established. The routing of the element to connect the plurality of components is automatically determined based on the routing guidelines.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

The present invention provides a routing design system configured to determine the routing of one or more elements among two or more components. Components may include, for example, electronic control modules (ECMs) or sensors. Elements may include, for example, a wire or a harness including one or more wires. For example, the system may include two components connected by a wire. Alternatively, the system may include many components connected by a plurality of wires, wherein the wires may be bundled in a harness.

Figure 1:
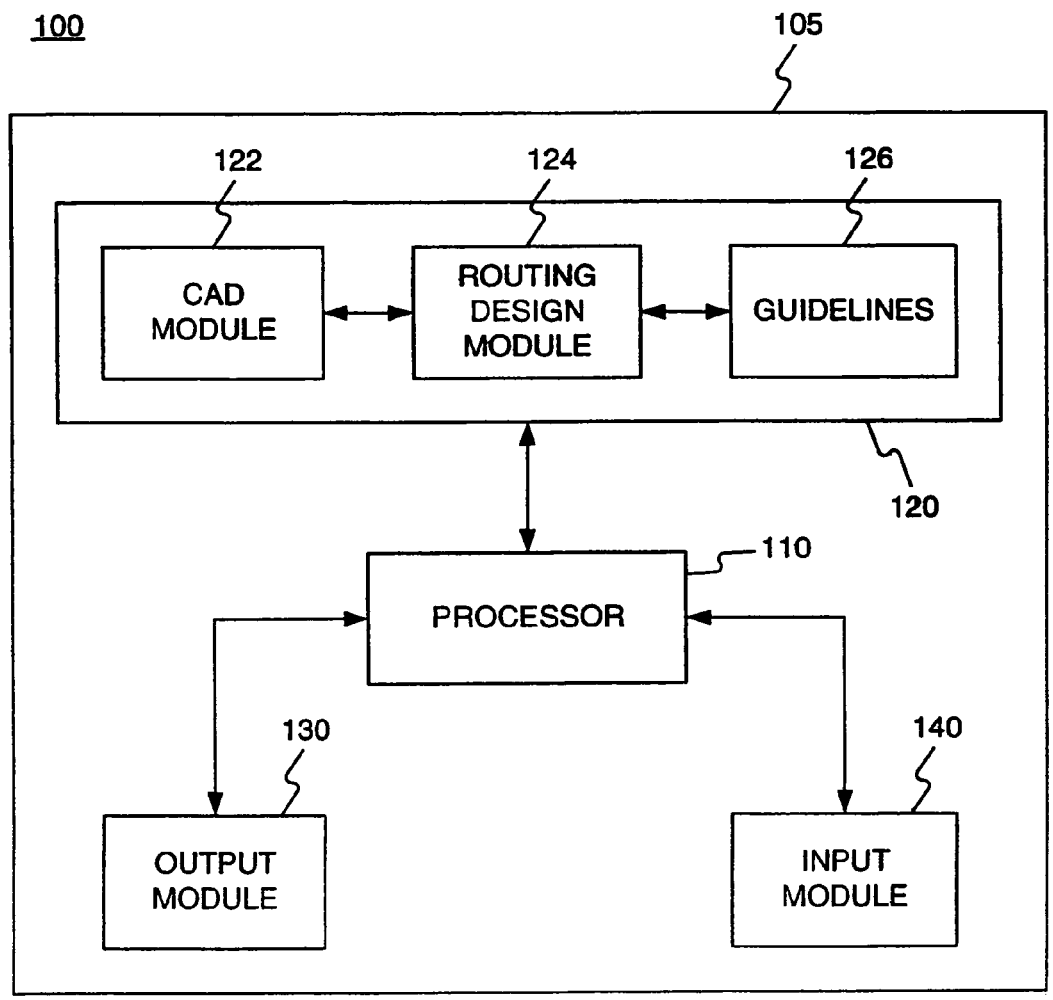
FIG. 1 is a block diagram of routing design system consistent with an exemplary embodiment of the present invention.

FIG. 1 illustrates an exemplary routing design system 100 consistent with the present invention. Routing design system 100 may include a computer 105. Computer 105 may include a processor 110, a memory 120, an output module 130, and an input module 140. Processor 110 may perform various aspects of harness or other routing design, based on instructions stored in memory 120. Further, processor 110 may provide completed harness or routing designs or design information, such as a bill of materials associated with the harness to output module 130. Processor 110 may also receive information from input module 140 for use while designing the harness.

Memory 120 may include a computer-aided design (CAD) module 122, a routing design module 124, and guidelines 126. CAD module 122 may include instructions used by processor 110 for establishing a system or machine design or creating a wiring diagram based on the system design. Although the term wiring diagram and wires are used throughout, it should be understood that a wire broadly means any element used for connecting one component to another, and a wiring diagram is a diagram illustrating the connections made between the components and the elements. In one exemplary embodiment, CAD module 122 may be implemented using a schematic entry tool, such as Pro-Engineer software. Routing design module 124 may include instructions used by processor 110 for designing a harness based on the wiring diagram and guidelines 126. Guidelines 126 may include system-dependent guidelines, such as the shape or footprint of the machine or proximity of wires to heat sources or machine edges. Guidelines 126 may also include element-dependent guidelines, such as wire bend radius limits. Guidelines 126 may also include component-dependent guidelines, such as, for example, the number of connections available on a particular component. Routing design module 124 may be implemented using software designed to interact with CAD module 122. Alternatively, CAD module 122 and routing design module 124 may be part of the same software package. Guidelines 126 may be stored locally on computer 105 or alternatively, may be accessible from a server or other computer (not shown) over a network, such as a local area network (LAN) or the Internet.

Output module 130 may receive harness designs or harness information from processor 110 to be printed or displayed. Output module 130, for example, may print or display three-dimensional models of the harness or two-dimensional flattened drawings of the harness, or may print or display harness information, such as data tables, parts list, or a bill of materials for the harness. The two-dimensional flattened drawing of the harness or routing element may include a view including straightened wires, which permit identification of the respective lengths of various wires or other elements or connections. Output module 130 may be connected to a display device, such as a monitor, or a printer. Alternatively, output module 130 may be connected to a storage device, such as a disk drive, for transferring the drawings and/or data to a storage medium, or to a network, such as a LAN or the Internet, for transferring the drawing and/or data to another computer or server.

Input module 140 may receive instructions from an operator for the design of a harness or other routing element. For example, input module 140 may receive information for establishing the system design or associated routing diagram. Input module 140 may receive inputs from a keyboard or other data-entry device, a storage medium reader, such as a CD-ROM drive, or via a network, such as a LAN or the Internet.

Computer 105 may be implemented in various environments to provide tools for designing a harness. Computer 105 may include hardware specifically constructed for performing various processes and operations of the invention or may include a general purpose computer or computing platform selectively activated or reconfigured by program code to provide the necessary functionality.

Figure 2:
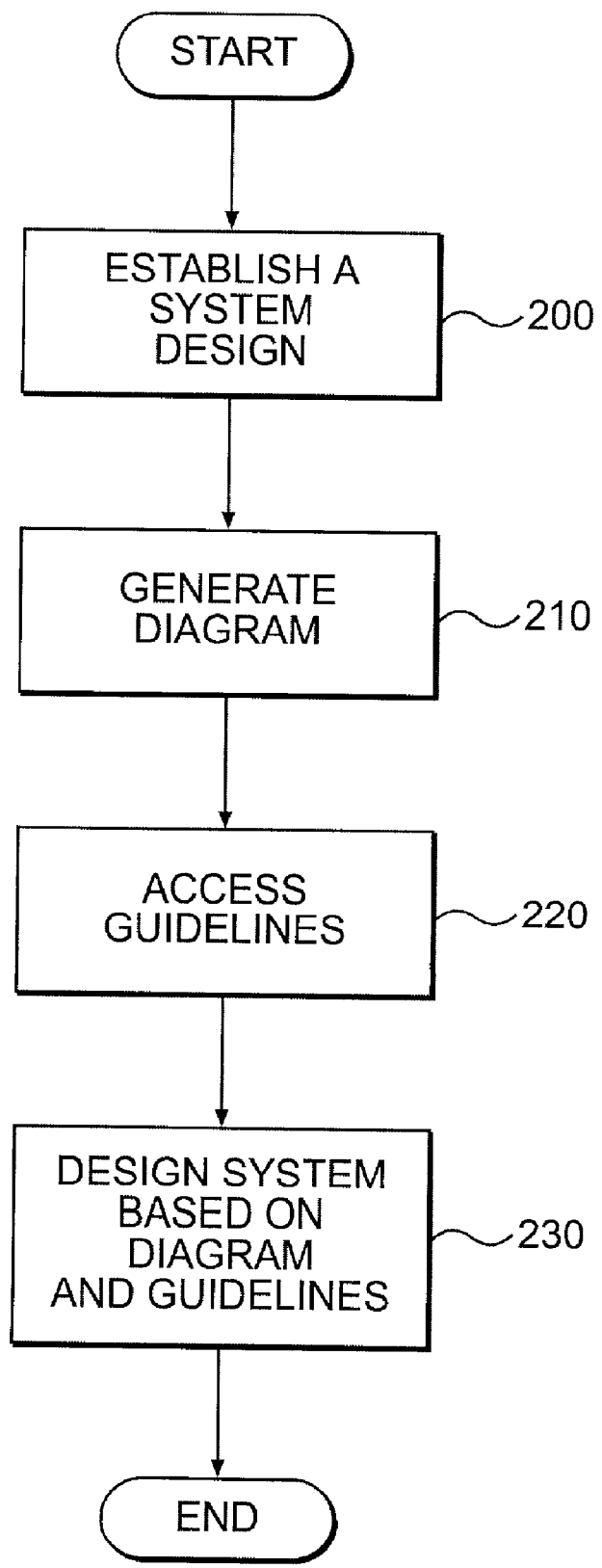
FIG. 2 is a flow chart of an exemplary embodiment of a method, consistent with the present invention, for designing a routing element.

FIG. 2 illustrates an exemplary flow chart of a method for designing a routing element, instructions for which may be included in routing design module 124 and/or CAD module 122 to be performed by processor 110. First, a system design is established (step 200). In one exemplary embodiment, the routing element may be a harness; however, the methods and systems described herein are equally applicable to any element that may be used for routing connections between components. The system design may include a set of basic components that need to be connected, as well the basic topography of the system. For example, a system design may include a list of components, such as ECM1, ECM2, and sensor1, and their general connections, such as ECM1 to sensor1 and ECM1 to ECM2. The system design may be established using CAD module 122. Alternatively, a pre-established system design may be provided to harness design system 100 via input module 140.

Based on the system design, a wiring diagram is generated (step 210). The wiring diagram indicates how the components are to be connected together by the elements. The wiring diagram may include a flat or two-dimensional, point-to-point drawing of the system. The wiring diagram may not be to scale. Further the wiring diagram may not take into account the geometry or footprint of the system. The wiring diagram may be generated manually or automatically. For example, given a connection table that lists what points in the system need to be connected, CAD module 122 may automatically generate a wiring diagram based on the table.

Next, guidelines are established (step 220). Guidelines provide general recommendations, rules, and/or standards for designing the harness. In one exemplary embodiment, guidelines may include recommendations for the routing of one or more elements through the routing design. Guidelines may be created by prompting the user to answer one or more questions. Alternatively, guidelines may be accessed via a storage medium reader. In one exemplary embodiment, guidelines 126 are stored in memory 120. In another embodiment, guidelines are stored at a centralized location, such as a server (not shown), and are accessed during the process of harness design. In this embodiment, use of uniform guidelines may be ensured. Further, in this embodiment, updating of guidelines is a simpler process since all guidelines are stored in one location. Guidelines may include machine dependent guidelines, such as the geometry or footprint of the machine and locations of heat sources or edges. Guidelines may also include element-dependent guidelines, such as the wire bend radius limits and allowable proximity of wires or components to heat sources or edges. Further, guidelines may include component-dependent guidelines, such as the number of connections permitted on a particular component.

A harness is then designed based on the wiring diagram and the guidelines (step 230). The harness may include one or more wires, or may include one or more bundles, each including one or more wires. Routing design module 124 may automatically determine which wires are to be included in each bundle. Routing design module 124 may also determine the packing, or layout, of the bundles within the harness structure. In one embodiment, routing design module 124 may consider the bundles to be packed beginning with a bundle that is attached to a connector or entry port of the harness structure. Once it places that bundle, routing design module 124 may consider adjacent bundles for placement.

INDUSTRIAL APPLICABILITY

Systems and methods are thus provided to streamline the harness design process. By using consistent guidelines as a basis for automated design, it is possible to improve uniformity because the guidelines may be automatically applied. As used in throughout this description, automatically means without an operator performing the task. Tasks performed automatically, however, may require an input from an operator in order for the task to begin. Further, automatically does not necessarily mean occurring immediately.

Further, systems and methods of the present invention provide for a streamlined process and eliminate costly redundant work at revisions. For example, in one exemplary embodiment, any change or update made with respect to the guidelines results in an automatic update to a harness design. For example, if during the process the geometry or footprint of the machine is altered or the space allocated for the harness structure is changed, routing design module 124 may automatically make appropriate corrections to an existing harness design, thus making revisions much more efficient.

Systems and methods of the present invention also provide for a streamlined process in that results of the harness design process can be used for various aspects in actually preparing the physical harness. For example, the results of the harness design process may be used to automatically determine a parts list. In one embodiment, the system may automatically recommend components needed for the routing structure, as well as other components, such as clips, connectors, or fittings. Based on this list of recommended components, the system may generate a bill of material or other list to assist in cost determination. For example, a supplier may be able to provide more effective price quotations given a bill of materials or a list of cost drivers, such as the number of splices, the number of bundles, or other factors. The bill of material may also be given to the supplier with increased confidence of accuracy.

It should be understood that systems and methods consistent with the present invention are applicable for fields other than conventional wiring diagrams. In particular, any field that benefits from intelligent routing based on one or more guidelines or standards may provide a potential uses for the present invention.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A computer-implemented method of designing a wiring structure, the wiring structure including at least one wiring element connecting a plurality of components, the method comprising:
   designing the wiring structure, the designing including identifying the plurality of components and establishing connections between the identified plurality of components by the at least one wiring element;
   generating a diagram of the wiring structure design, the diagram illustrating a routing pattern of the at least one wiring element and the connections between the plurality of components;
   receiving guidelines for designing the wiring structure, the guidelines including physical restrictions imposed on the wiring structure by a system into which the wiring structure is to be incorporated;
   automatically modifying the wiring structure design using the received guidelines and the diagram, the modifying including adjusting the routing pattern of the at least one wiring element according to the imposed physical restrictions; and
   creating the wiring structure using the modified wiring structure design.

2. The method of claim 1, wherein designing the wiring structure further includes:
   identifying multiple sets of one or more wiring elements that can be bundled; and
   determining a layout for each identified bundle within the wiring structure.

3. The method of claim 1, further including:
   receiving one or more revised guidelines for designing the wiring structure; and
   automatically readjusting the routing pattern of the at least one wiring element based on the revised guidelines.

4. The method of claim 1, further including providing a drawing illustrating the wiring structure.

5. The method of claim 1, further including automatically providing information about the wiring structure design.

6. The method of claim 5, wherein the information includes at least one of a three-dimensional drawing of the wiring structure design, a two-dimensional drawing of the wiring structure design, a list of components, and a bill of materials associated with the wiring structure design.

7. The method of claim 1, wherein the wiring structure includes a wiring harness.

8. The method of claim 1, wherein the guidelines are determined by prompting a user to answer one or more questions.

9. A computer-readable medium including instructions which, when executed by a computer, causes the computer to perform a method of designing a wiring structure, the wiring structure including at least one wiring element connecting a plurality of components, the method comprising:
   designing the wiring structure, the designing including identifying the plurality of components and establishing connections between the identified plurality of components by the at least one wiring element;
   generating a diagram of the wiring structure design, the diagram illustrating a routing pattern of the at least one wiring element and the connections between the plurality of components;
   accessing guidelines for designing the wiring structure, the guidelines including physical restrictions imposed on the wiring structure by a system into which the wiring structure is to be incorporated;
   automatically modifying the wiring structure design using the received guidelines and the diagram, the modifying including adjusting the routing pattern of the at least one wiring element according to the imposed physical restrictions;
   creating the wiring structure using the adjusted wiring structure design; and
   generating a bill of materials for the wiring structure based on the modified wiring structure design.

10. The computer-readable medium of claim 9, wherein the method further includes:
    identifying multiple sets of one or more wiring elements that can be bundled; and
    determining a routing pattern in the wiring structure for each identified bundle.

11. The computer-readable medium of claim 9, wherein the method further includes:
   receiving one or more revised guidelines for designing the wiring structure; and
   automatically readjusting the routing pattern of the at least one element based on the revised guidelines.

12. The computer-readable medium of claim 9, wherein the method further includes providing a schematic illustrating the wiring structure.

13. The computer-readable medium of claim 9, wherein the guidelines are determined according to standards associated with the system.

14. The computer-readable medium of claim 9, wherein the method further includes automatically providing information about the wiring structure design.

15. The computer-readable medium of claim 9, wherein automatically providing information includes providing at least one of a three-dimensional drawing of the wiring structure design, a two-dimensional drawing of the wiring structure design, and a list of elements and components.

16. The computer-readable medium of claim 9, wherein the wiring structure includes a wiring harness.

17. A computer-implemented tool for designing a wiring structure, the wiring structure including at least one wiring element connecting a plurality of components, the tool comprising:
   a processor; and
   a computer-readable memory, including:
      a computer-aided design module that, when executed by the processor:
         receives input of a design for the wiring structure, the design identifying the plurality of components and establishing connections between the identified plurality of components by the at least one wiring element, and
         generates a diagram of the wiring structure design, the diagram illustrating a routing pattern of the at least one wiring element and the connections between the plurality of components; and
      a design module that, when executed by the processor:
         accesses one or more guidelines for designing the wiring structure, the guidelines including physical restrictions imposed on the wiring structure by a system into which the wiring structure is to be incorporated,
         automatically modifies the wiring structure design using the accessed guidelines and the diagram, the modifying including adjusting the routing pattern of the at least one wiring element according the imposed physical restrictions,
         receives a revision of the one or more guidelines for designing the wiring structure, and
         automatically readjusts the routing pattern of the at least one wiring element based on the revision.

18. The tool of claim 17, wherein the design module is software designed to work with the computer-aided design module.

19. A tool for designing a wiring structure, the wiring structure including at least one wiring element connecting a plurality of components, the tool comprising:
   a routing design module embodied in computer-readable memory configured to:
      receive a design for the wiring structure, the design identifying the plurality of components and establishing connections between the identified plurality of components by the at least one wiring element;
      generate a diagram of the wiring structure design the diagram illustrating a routing pattern of the at least one wiring element and the connections between the plurality of components;
      accessing guidelines for designing the wiring structure, the guidelines including physical restrictions imposed on the wiring structure by a system into which the wiring structure is to be incorporated;
      automatically modifying the wiring structure design using the received guidelines and the diagram, the modifying including adjusting the routing pattern of the at least one wiring element according to the imposed physical restrictions; and
      generating a bill of materials for the wiring structure based on the modified wiring structure design.

20. The tool of claim 19, the guidelines are stored in a centralized location.

21. A computer-implemented method of designing a wiring structure, the wiring structure including at least one wiring element connecting a plurality of components, the method comprising:
   receiving a design for the wiring structure, the design identifying the plurality of components, establishing connections between the plurality of components by the at least one wiring element, and establishing a routing pattern of the at least one wiring element;
   receiving guidelines for designing the wiring structure, the guidelines including physical restrictions imposed on the wiring structure by a system into which the wiring structure is to be incorporated;
   automatically modifying the wiring structure design using the received guidelines, the modifying including adjusting the routing pattern of the at least one wiring element according to the imposed physical restrictions;
   creating a bill of materials for the wiring structure based on the modified wiring structure design; and
   creating the wiring structure based on the modified wiring structure design.

22. A computer-implemented method for designing a wiring structure, the wiring structure including at least one wiring element connecting a plurality of components the method comprising:
   receiving a design for the wiring structure, wherein the design identifies the plurality of components and establishes connections between the plurality of components by the at least one wiring element;
   generating a diagram of the wiring structure design, the diagram illustrating the plurality of components, the connections between the plurality of components by the at least one wiring element, and a routing pattern of the at least one wiring element;
   accessing guidelines for designing wiring structure, the guidelines including physical restrictions imposed on the wiring structure by a system into which the wiring structure is to be incorporated;
   automatically modifying the wiring structure design using the accessed guidelines, the modifying including adjusting the routing pattern of the at least one wiring element according to the imposed physical restrictions;
   receiving at least one revision of the guidelines; and
   automatically readjusting the routing pattern of the at least one wiring element based on the at least one revision of the guidelines.

* * * * *